United States Patent
Tsai et al.

(10) Patent No.: US 10,911,995 B2
(45) Date of Patent: Feb. 2, 2021

(54) APPARATUSES AND METHODS FOR DUAL ACTIVE OF MULTIPLE SUBSCRIBER IDENTITIES

(71) Applicant: MEDIATEK INC., Hsinchu (TW)

(72) Inventors: Chih-Yuan Tsai, Hsinchu (TW); Wei-Chiang Peng, Hsinchu (TW); Kun-Lin Wu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/792,462

(22) Filed: Feb. 17, 2020

(65) Prior Publication Data

US 2020/0296638 A1    Sep. 17, 2020

Related U.S. Application Data

(60) Provisional application No. 62/818,803, filed on Mar. 15, 2019.

(51) Int. Cl.
| | |
|---|---|
| *H04W 36/00* | (2009.01) |
| *H04W 88/06* | (2009.01) |
| *H04W 8/18* | (2009.01) |
| *H04M 7/00* | (2006.01) |
| *H04W 36/28* | (2009.01) |

(Continued)

(52) U.S. Cl.
CPC ....... *H04W 36/0069* (2018.08); *H04M 7/006* (2013.01); *H04W 8/18* (2013.01); *H04W 36/0058* (2018.08); *H04W 36/28* (2013.01); *H04W 36/30* (2013.01); *H04W 76/27* (2018.02); *H04W 88/06* (2013.01)

(58) Field of Classification Search
CPC ... H04W 36/0069; H04W 88/06; H04W 8/18; H04W 36/30; H04W 36/0058; H04W 36/28; H04W 76/27; H04M 7/006
See application file for complete search history.

(56) References Cited

U.S. PATENT DOCUMENTS

| | | | |
|---|---|---|---|
| 2015/0296423 A1 | 10/2015 | Zhang | |
| 2016/0219421 A1* | 7/2016 | Shi | H04W 76/15 |
| 2017/0180550 A1* | 6/2017 | Geo | H04M 3/4288 |

(Continued)

OTHER PUBLICATIONS

Chinese language office action dated Nov. 19, 2020, issued in application No. TW 109107183.

*Primary Examiner* — Marisol Figueroa
(74) *Attorney, Agent, or Firm* — McClure, Qualey & Rodack, LLP (57) ABSTRACT

A mobile communication device including a first RF device, a second RF device, and a controller is provided. The first and second RF devices perform wireless transmission and reception utilizing a first RAT and a second RAT, respectively. The controller detects, during a communication with a first cell using a first subscriber identity, an incoming event for making a voice call or conducting a data session using a second subscriber identity via the second RF device, and switches the communication associated with the first subscriber identity to a second cell which utilizes the first RAT in a frequency band on which dual connectivity over the first and second RATs is supported, or enables the voice call associated with the second subscriber identity to be made via the first RF device when the communication associated with the first subscriber identity is performed via the second RF device.

20 Claims, 9 Drawing Sheets

(51) Int. Cl.
*H04W 36/30* (2009.01)
*H04W 76/27* (2018.01)

(56) References Cited

U.S. PATENT DOCUMENTS

2018/0167853 A1* 6/2018 Wang ................ H04W 36/0027
2018/0352491 A1   12/2018 Shih et al.

* cited by examiner

| Initially camped RAT | | Incoming event | | 5G NSA/SA connected | |
|---|---|---|---|---|---|
| 1st subscriber ID (from data (U)SIM) | 2nd subscriber ID | 1st subscriber ID | 2nd subscriber ID | 1st subscriber ID | 2nd subscriber ID |
| 5G | 4G and/or 5G | 5G data session | / | SA | / |
| 5G | 4G and/or 5G | VoNR | / | SA | / |
| 5G | 4G and/or 5G | VoLTE (EPS fallback) | / | Don't care | / |
| 5G | 5G | / | VoNR | / | SA |
| 5G | 5G | / | VoNR | / | SA |
| 5G | 4G and/or 5G | / | VoLTE (EPS fallback) | / | Don't care |

FIG. 4A

| Action triggered | | Newly camped RAT | |
|---|---|---|---|
| 1st subscriber ID | 2nd subscriber ID | 1st subscriber ID (from data (U)SIM) | 2nd subscriber ID |
| | Trigger switching to 4G cell in UE supported EN-DC band | 5G | 4G |
| | Trigger switching to 4G cell in UE supported EN-DC band | 5G | 4G |
| | Trigger switching to 5G cell in UE supported EN-DC band | 4G | 5G |
| Trigger switching to 4G cell in UE supported EN-DC band | | 4G | 5G |
| | Trigger EPS fallback by sending measurement report of event type B1/B2 | 5G | 4G |
| Trigger switching to 5G cell in UE supported EN-DC band | | 5G | 4G |

FIG. 4B

APPARATUSES AND METHODS FOR DUAL ACTIVE OF MULTIPLE SUBSCRIBER IDENTITIES

CROSS REFERENCE TO RELATED APPLICATIONS

This Application claims priority of U.S. Provisional Application No. 62/818,803, filed on Mar. 15, 2019, the entirety of which is incorporated by reference herein.

BACKGROUND OF THE APPLICATION

Field of the Application

The application generally relates to multi-Subscriber Identity Module (SIM) coordination, and more particularly, to apparatuses and methods for dual active of multiple subscriber identities.

Description of the Related Art

With the growing demand for ubiquitous computing and networking, various Radio Access Technologies (RATs) have been developed, such as Global System for Mobile communications (GSM) technology, General Packet Radio Service (GPRS) technology, Enhanced Data rates for Global Evolution (EDGE) technology, Universal Mobile Telecommunications System (UMTS) technology, Interim Standard 95 (IS-95) technology, Code Division Multiple Access 2000 (CDMA-2000) technology, CDMA-2000 1× Evolution-Data Optimized or Evolution-Data (CDMA-2000 1× EV-DO) technology, Time Division-Synchronous Code Division Multiple Access (TD-SCDMA) technology, Worldwide Interoperability for Microwave Access (WiMAX) technology, Long Term Evolution (LTE) technology, Long Term Evolution-Advanced (LTE-A) technology, Time-Division LTE (TD-LTE) technology, New Radio (NR) technology, and others. In particular, GSM/GPRS/EDGE technology is also called 2G cellular technology; WCDMA/CDMA-2000/TD-SCDMA technology is also called 3G cellular technology; LTE/LTE-A/TD-LTE technology is also called 4G cellular technology; and NR technology is also called 5G cellular technology.

Generally, a cellular phone (which may also be referred to as a User Equipment (UE) or Mobile Station (MS)) only supports one RAT and provides the user with flexible mobile communications at all times via the supported RAT using a single subscriber identity card (which provides a single subscriber identity). However, to an increasing extent, more and more people find that having an additional subscriber identity card (which provides an additional subscriber identity) is a good way to reduce their mobile service charges (including voice and/or data services), or to separate personal and business phone calls. In order to alleviate the burden of carrying two cellular phones for two separate subscriber identity cards, so-called dual-card cellular phones have been developed, which generally support one or more RATs for respective mobile services using an individual subscriber identity card. The dual-card design allows calls to be made or received on either subscriber identity amid other mobile services.

Most dual-card cellular phones are generally equipped with a single Radio Frequency (RF) device to keep costs low. Due to a single RF device being shared by the transmission/reception operations associated with two separate subscriber identities, only one subscriber identity is allowed to occupy the single RF device for transmission/reception operations at any given time. That is, if a call request for one subscriber number is received while another call is already active on the other subscriber number, the latter call will be missed.

BRIEF SUMMARY OF THE APPLICATION

The present application proposes various scenarios to leverage the feature of Evolved-Universal Terrestrial Radio Access (E-UTRA)-NR Dual Connectivity (EN-DC), NR-EUTRA Dual Connectivity (NE-DC), or Next Generation EN-DC (NGEN-DC), which is generally applied to single-card cellular phones, for supporting dual active of two subscriber identities on a dual-card cellular phone. Specifically, in a conventional application of EN-DC/NE-DC/NGEN-DC, a cell phone may have dual connectivity with a 5G network and a 4G network simultaneously using a single subscriber identity. By contrast, in the present application, the dual connectivity with a 5G network and a 4G network for a single subscriber identity is divided into a connectivity with a 5G network for one subscriber identity and a connectivity with a 4G network for another subscriber identity.

In one aspect of the application, a mobile communication device comprising a first RF device, a second RF device, and a controller is provided. The first RF device is configured to perform wireless transmission and reception utilizing a first RAT. The second RF device is configured to perform wireless transmission and reception utilizing a second RAT. The controller is configured to use a first subscriber identity to communicate with a first cell via the first RF device or the second RF device, detect an incoming event for making a voice call or conducting a data session using a second subscriber identity via the second RF device during the communication associated with the first subscriber identity, and in response to the incoming event, switch the communication associated with the first subscriber identity to a second cell which utilizes the first RAT in a frequency band on which dual connectivity over the first RAT and the second RAT is supported, or enable the voice call associated with the second subscriber identity to be made via the first RF device when the communication associated with the first subscriber identity is performed via the second RF device.

In another aspect of the application, a method for dual active of multiple subscriber identities, executed by a mobile communication device which comprises a first RF device utilizing a first RAT and a second RF device utilizing a second RAT, is provided. The method comprises the steps of: using a first subscriber identity to communicate with a first cell via the first RF device or the second RF device; detecting an incoming event for making a voice call or conducting a data session using a second subscriber identity via the second RF device during the communication associated with the first subscriber identity; and in response to the incoming event, switching the communication associated with the first subscriber identity to a second cell which utilizes the first RAT in a frequency band on which dual connectivity over the first RAT and the second RAT is supported, or enabling the voice call associated with the second subscriber identity to be made via the first RF device when the communication associated with the first subscriber identity is performed via the second RF device.

In yet another aspect of the application, a non-transitory computer-readable storage medium comprising computer program that, when executed, causes a mobile communication device comprising a first RF device utilizing a first RAT and a second RF device utilizing a second RAT to perform a method for dual active of multiple subscriber identities. The method comprises the steps of: using a first subscriber identity to communicate with a first cell via the first RF device or the second RF device; detecting an incoming event for making a voice call or conducting a data session using a second subscriber identity via the second RF device during the communication associated with the first subscriber identity; and in response to the incoming event, switching the communication associated with the first subscriber identity to a second cell which utilizes the first RAT in a frequency band on which dual connectivity over the first RAT and the second RAT is supported, or enabling the voice call associated with the second subscriber identity to be made via the first RF device when the communication associated with the first subscriber identity is performed via the second RF device.

Other aspects and features of the present application will become apparent to those with ordinarily skill in the art upon review of the following descriptions of specific embodiments of the mobile communication devices, the non-transitory computer-readable storage media, and the methods for dual active of multiple subscriber identities.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
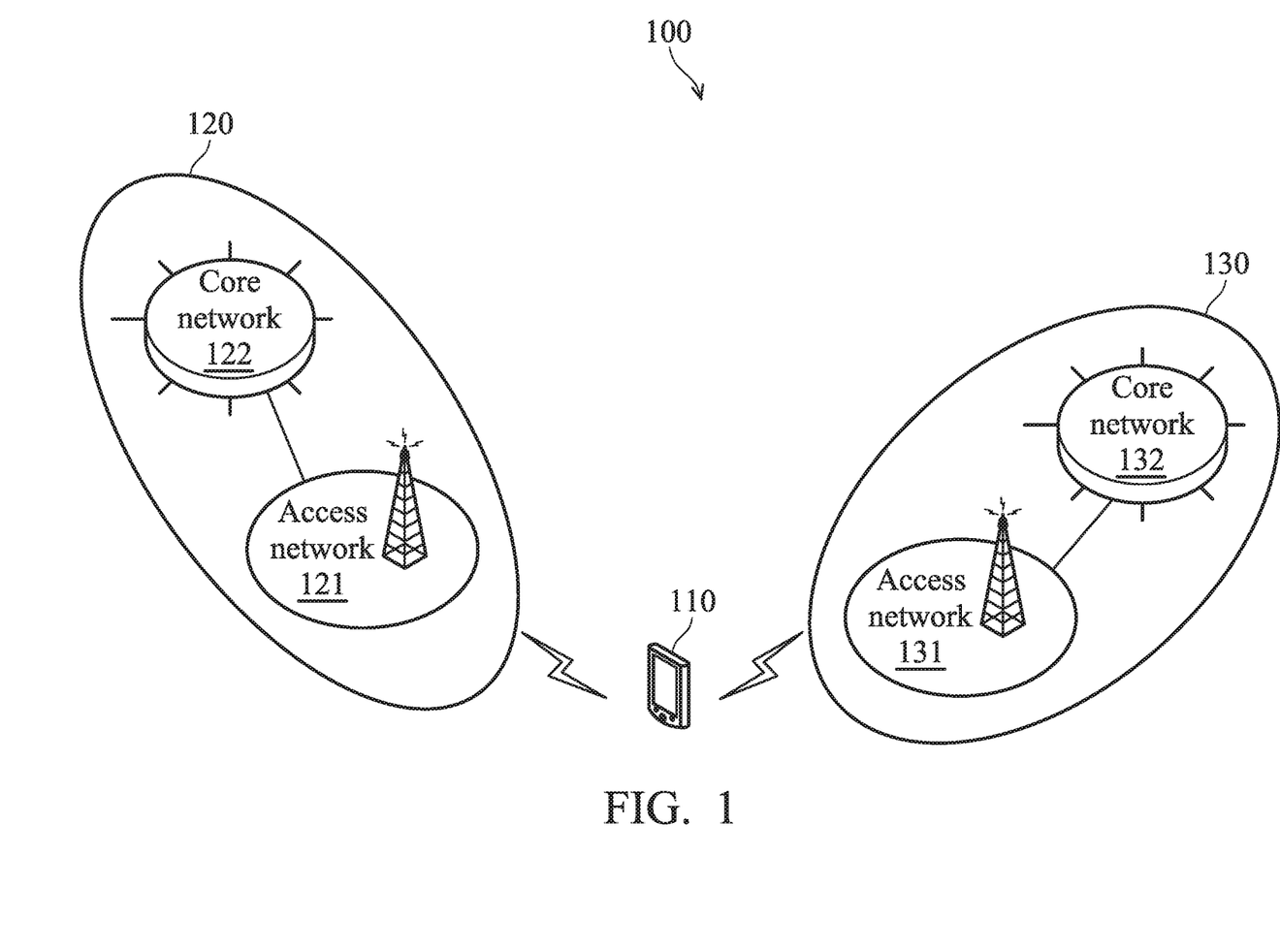
FIG. 1 is a block diagram of a wireless communication environment according to an embodiment of the application.

FIG. 1 is a block diagram of a wireless communication environment according to an embodiment of the application. As shown in FIG. 1, the wireless communication environment 100 includes a mobile communication device 110 and two service networks 120 and 130.

The mobile communication device 110 may be referred to as a User Equipment (UE) or Mobile Station (MS), such as a feature phone, a smartphone, a panel Personal Computer (PC), a laptop computer, or any computing device supporting the RATs utilized by the service networks 120 and 130.

The mobile communication device 110 may wirelessly communicate with one or both of the service networks 120 and 130 using two separate subscriber identities.

The subscriber identities may be provided by one or two subscriber identity cards (not shown) in compliance with the specifications of the RAT utilized by the service networks 120 and 130. For example, the subscriber identity cards may include a Subscriber Identity Module (SIM) card if one of the service networks 120 and 130 is a GSM/GPRS/EDGE/IS-95 network, or may include a Universal SIM (USIM) card if one of the service networks 120 and 130 is a WCDMA/LTE/LTE-A/TD-LTE/NR network.

Alternatively, the subscriber identities may be directly written into the mobile communication device 110, without the need for any socket to insert any subscriber identity card, or the subscriber identities may be provided by one or more virtual subscriber identity cards (e.g., eSIM/eUSIM), and the present application is not limited thereto.

The service network 120 may be a legacy cellular network, while the service network 130 may be an advanced cellular network. For example, the service network 120 may be a 4G network, while the service network 130 may be a 5G network. Alternatively, the service network 120 may be a 2G network (e.g., a GSM/GPRS/EDGE/IS-95 network) or a 3G network (e.g., a WCDMA/CDMA-2000/TD-SCDMA network), while the service network 130 may be a 4G network (e.g., an LTE/LTE-A/TD-LTE network), and the present application should not be limited thereto.

The service network 120 includes an access network 121 and a core network 122, and the service network 130 includes an access network 131 and a core network 132. The access networks 121 and 131 are responsible for processing radio signals, terminating radio protocols, and connecting the mobile communication device 110 with the core networks 122 and 132, respectively. The core networks 122 and 132 are responsible for performing mobility management, network-side authentication, and interfaces with public/external networks (e.g., the Internet).

The access networks 121 and 131 and the core networks 122 and 132 may each include one or more network nodes for carrying out said functions. For example, if the service network 120 is a GSM/GPRS/EDGE network, the access network 121 may be a GSM EDGE Radio Access Network (GERAN) which includes at least a Base Transceiver Station (BTS) and a Base Station Controller (BSC), and the core network 122 may be a GPRS core which includes at least a Mobile Switching Center (MSC), a Home Location Register (HLR), a Serving GPRS Support Node (SGSN), and a Gateway GPRS Support Node (GGSN).

If the service network 120 is a WCDMA network, the access network 121 may be a Universal Terrestrial Radio Access Network (UTRAN) and the core network 122 may be a GPRS core which includes a Home Location Register (HLR), at least one Serving GPRS Support Node (SGSN), and at least one Gateway GPRS Support Node (GGSN).

If the service network 120 or 130 is an LTE/LTE-A/TD-LTE network, the access network 121 or 131 may be an Evolved-UTRAN (E-UTRAN) which includes at least an evolved NB (eNB) (e.g., a macro eNB, femto eNB, or pico eNB), and the core network 122 or 132 may be an Evolved Packet Core (EPC) which includes a Home Subscriber Server (HSS), Mobility Management Entity (MME), Serving Gateway (S-GW), Packet Data Network Gateway (PDN-GW or P-GW), and IP Multimedia Subsystem (IMS) server.

If the service network 130 is an NR network, the access network 131 may be a Next Generation Radio Access Network (NG-RAN) which includes at least a gNB or Transmission Reception Point (TRP), and the core network 132 may be a Next Generation Core Network (NG-CN) which includes various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session.

The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

In one embodiment, the service network 130 (e.g., a 5G network) may be deployed in the Non-Standalone (NSA) architecture which depends on the control plane of the service network 120 (e.g., a 4G network) for control functions, while the service network 130 is exclusively focused on user plane. The NSA architecture may support the feature of Evolved-Universal Terrestrial Radio Access (E-UTRA)-NR Dual Connectivity (EN-DC), NR-EUTRA Dual Connectivity (NE-DC), or Next Generation EN-DC (NGEN-DC), which allows the mobile communication device 110 to be able to have dual connectivity with both the service networks 120 and 130 simultaneously.

Although not shown, the service networks 120 and 130 may support interworking with specific communication interface(s). For example, there may be an interface connecting the NG-RAN of an NR network (e.g., the service network 130) to the EPC of an LTE network (e.g., the service network 120), or an interface connecting the E-UTRAN of an LTE network (e.g., the service network 120) to the NG-CN of an NR network (e.g., the service network 130), or an interface connecting the E-UTRAN of an LTE network (e.g., the service network 120) to the NG-RAN of an NR network (e.g., the service network 130).

It should be understood that wireless communication environment 100 is for illustrative purposes only and is not intended to limit the scope of the application. For example, the present application could be applied to other RATs, as long as the mobile communication device 110 supports dual connectivity over the RATs utilized by the service networks 120 and 130.

Figure 2:
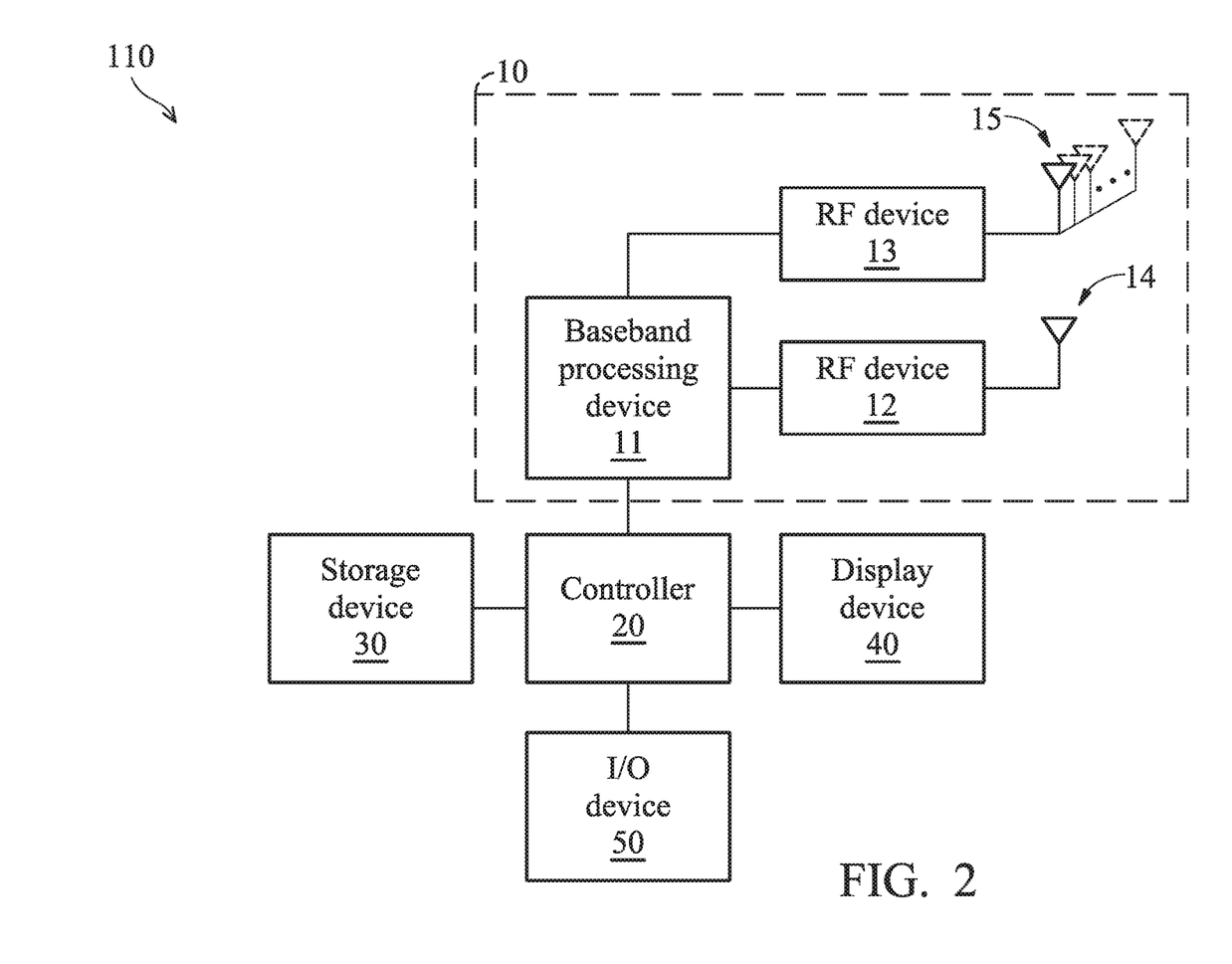
FIG. 2 is a block diagram illustrating the mobile communication device 110 according to an embodiment of the application.

FIG. 2 is a block diagram illustrating the mobile communication device 110 according to an embodiment of the application.

As shown in FIG. 2, the mobile communication device 110 includes a wireless transceiver 10, a controller 20, a storage device 30, a display device 40, and an Input/Output (I/O) device 50.

The wireless transceiver 10 is configured to perform wireless transmission and reception to and from the cells formed by the service networks 120 and 130 using two subscriber identities. Particularly, the wireless transceiver 10 includes two sets of RF device and antenna for supporting the feature of EN-DC, NE-DC, or NGEN-DC.

Specifically, the wireless transceiver 10 includes a baseband processing device 11, two RF devices 12 and 13, and two antennas 14 and 15, wherein the baseband processing device 11 controls the RF device 12 and the antenna 14 for wireless transceiving with the service network 120, and controls the RF device 13 and the antenna 15 (which may include an antenna array for beamforming) for wireless transceiving with the service network 130.

To further clarify, the baseband processing device 11 is configured to perform baseband signal processing and control the communications between multiple subscriber identity cards (not shown) and the RF devices 12 and 13. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

In one embodiment, a dual-card controller (not shown) may be coupled between the baseband processing device 11 and multiple subscriber identity cards (not shown) for powering the subscriber identity cards with the same or different voltage levels according to the requirements thereof by a Power Management Integrated Chip (PMIC) and a battery, wherein the voltage level for each subscriber identity card is determined during initiation. The baseband processing device 11 may read data from each of the subscriber identity cards, and writes data to one of the subscriber identity cards via the dual-card controller. In addition, the dual-card controller may selectively transfer clocks, resets, and/or data signals to the subscriber identity cards according to instructions issued by the baseband processing device 11.

In another embodiment, the baseband processing device 11 may include multiple interfaces (not shown) which independently handle the connections to multiple subscriber identity cards (not shown).

The RF devices 12 and 13 may receive RF wireless signals via the antennas 14 and 15, respectively, convert the received RF wireless signals to baseband signals, which are processed by the baseband processing device 11, or receive baseband signals from the baseband processing device 11 and convert the received baseband signals to RF wireless signals, which are later transmitted via the antennas 14 and 15, respectively. Each of the RF devices 12 and 13 may contain multiple hardware devices to perform radio frequency conversion. For example, each of the RF devices 12 and 13 may include a mixer to multiply the baseband signals with a carrier oscillated in the radio frequency of the supported RAT, wherein the radio frequency may be 900 MHz, 1800 MHz or 1900 MHz utilized in a 2G cellular technology (e.g., GSM/EDGE/GPRS technology), or may be 900 MHz, 1900 MHz or 2100 MHz utilized in a 3G cellular technology (e.g., WCDMA technology), or may be 850 MHz, 1900 MHz, or may be 900 MHz, 2100 MHz, or 2.6 GHz utilized in a 4G cellular technology (e.g., LTE/LTE-A/TD-LTE technology), or any radio frequency (e.g., 30 GHz-300 GHz for mmWave) utilized in a 5G cellular technology (e.g., NR technology), or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the function of data processing and computing, controlling the wireless transceiver 10 for coordinating the communication operations associated with two separate subscriber identities, storing and retrieving data to and from the storage device 30, sending a series of frame data (e.g. representing text messages, graphics, images, etc.) to the display device 40, and receiving/outputting signals from/to the I/O device 50.

Particular, the controller 20 is responsible for coordinating the aforementioned operations of the wireless transceiver 10, the storage device 30, the display device 40, and the I/O device 50 for performing the method for dual active of multiple subscriber identities.

In another embodiment, the controller 20 may be incorporated into the baseband processing device 11, serving as a baseband processor.

As will be appreciated by persons skilled in the art, the circuits of the controller 20 will typically include transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of operating system(s), applications, communication protocols, and/or the method of the present application.

The display device 40 may be a Liquid-Crystal Display (LCD), Light-Emitting Diode (LED) display, Organic LED (OLED) display, or Electronic Paper Display (EPD), etc., for providing a display function. Alternatively, the display device 40 may further comprise one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., serving as the Man-Machine Interface (MMI) for interaction with users.

It should be understood that the components described in the embodiment of FIG. 2 are for illustrative purposes only and are not intended to limit the scope of the application. For example, the mobile communication device 110 may further include a Wireless-Fidelity (Wi-Fi) device for providing a short-range wireless communication function, a Global Positioning System (GPS) device for use of some location-based services or applications, and/or power, etc. Alternatively, the mobile communication device 110 may include fewer components. For example, the mobile communication device 110 may not include the display device 40 and/or the I/O device 50.

FIGS. 3A to 3E show a flow chart illustrating the method for dual active of multiple subscriber identities according to an embodiment of the application.

In this embodiment, the method for dual active of multiple subscriber identities may be applied to a mobile communication device equipped with a first RF device utilizing a first RAT and a second RF device utilizing a second RAT.

Figure 3A:
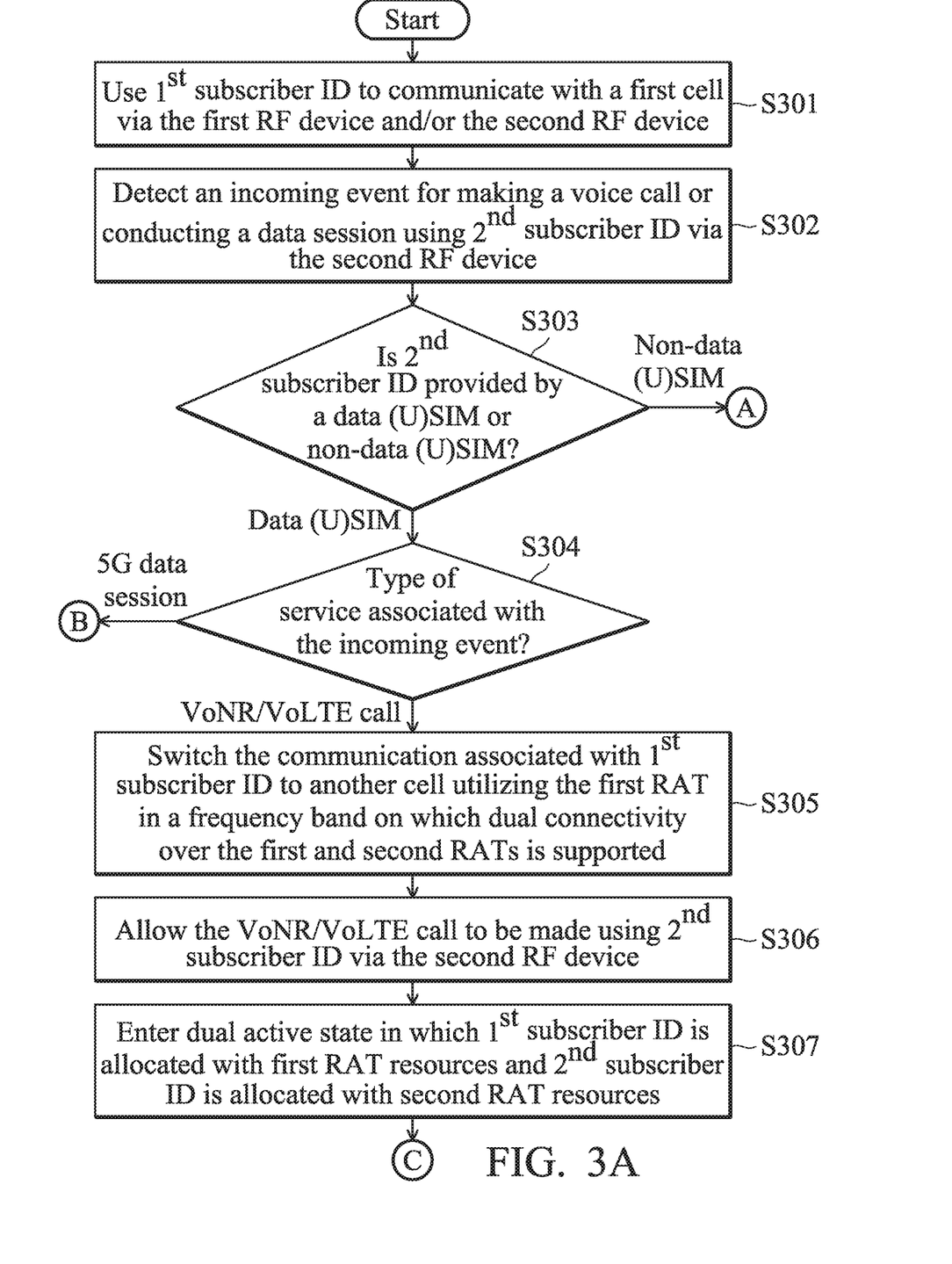
FIGS. 3A to 3E show a flow chart illustrating the method for dual active of multiple subscriber identities according to an embodiment of the application.

To begin with, the mobile communication device uses a first subscriber identity to communicate with a first cell via the first RF device and/or the second RF device (step S301).

Next, during the communication associated with the first subscriber identity, the mobile communication device detects an incoming event for making a voice call or conducting a data session using a second subscriber identity via the second RF device (step S302).

In response to the incoming event, the mobile communication device determines whether the second subscriber identity is provided by a SIM/USIM card configured for data services or non-data services (step S303).

Subsequent to step S303, if the second subscriber identity card is provided by a SIM/USIM card configured for data services (i.e., a data (U)SIM card), the mobile communication device determines whether the type of service associated with the incoming event is a VoNR call, an VoLTE call, or a 5G data session (step S304).

Subsequent to step S304, if the type of service associated with the incoming event is a VoNR call (i.e., the second RAT is a 5G cellular technology) or an VoLTE call (i.e., the second RAT is a 4G cellular technology), the mobile communication device switches the communication associated with the first subscriber identity to another cell utilizing the first RAT in a frequency band on which dual connectivity over the first RAT and the second RAT is supported (step S305).

Specifically, if the communication associated with the first subscriber identity is in an idle mode (e.g., the RRC_IDLE mode), the switching of the communication associated with the first subscriber identity to another cell may include triggering a cell selection or reselection procedure using the first subscriber identity to switch from the first cell to another cell. Otherwise, if the communication associated with the first subscriber identity is in a connected mode (e.g., the RRC_CONNECTED mode), the switching of the communication associated with the first subscriber identity to another cell may include triggering a handover procedure using the first subscriber identity to switch from the first cell to another cell.

Figure 3B:
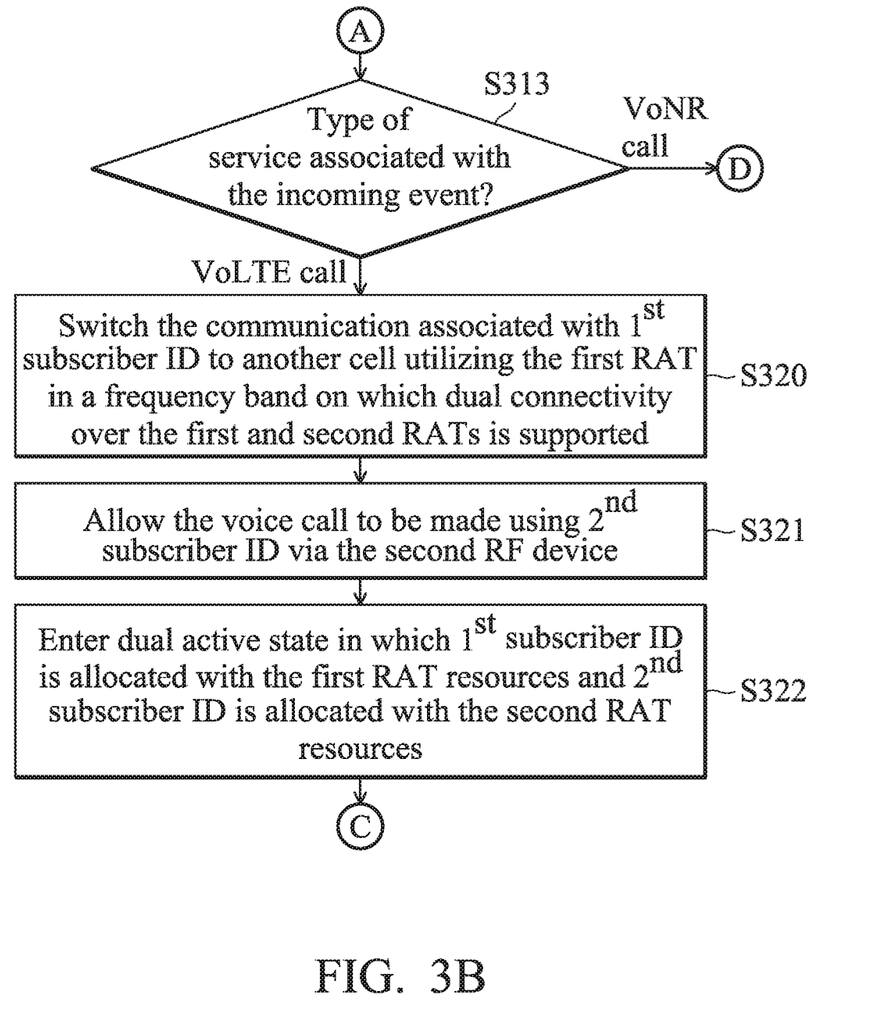

Subsequent to step S305, the mobile communication device allows the VoNR call or the VoLTE call to be made using the second subscriber identity via the second RF device (step S306), and enters a dual active state in which the first subscriber identity is allocated with the first RAT resources (including the first RF device, and the radio resources of the first RAT) and the second subscriber identity is allocated with the second RAT resources (including the second RF device, and the radio resources of the second RAT) (step S307).

Back to step S304, if the type of service associated with the incoming event is a 5G data session, the mobile communication device determines whether the access type of the second subscriber identity with the currently registered network is Non-Standalone (NSA) or Standalone (SA) (step S308).

Subsequent to step S308, if the access type of the second subscriber identity with the currently registered network is NSA, the mobile communication device conduct the 5G data session using the second subscriber identity via the first RF device and the second RF device (step S309), and the method ends. Otherwise, if the access type of the second subscriber identity with the currently registered network is SA, the mobile communication device switches the communication associated with the first subscriber identity to another cell utilizing the first RAT in a frequency band on which dual connectivity over the first RAT (e.g., LTE/LTE-A/TD-LTE technology) and the second RAT (e.g., NR technology) is supported (step S310).

Figure 3C:
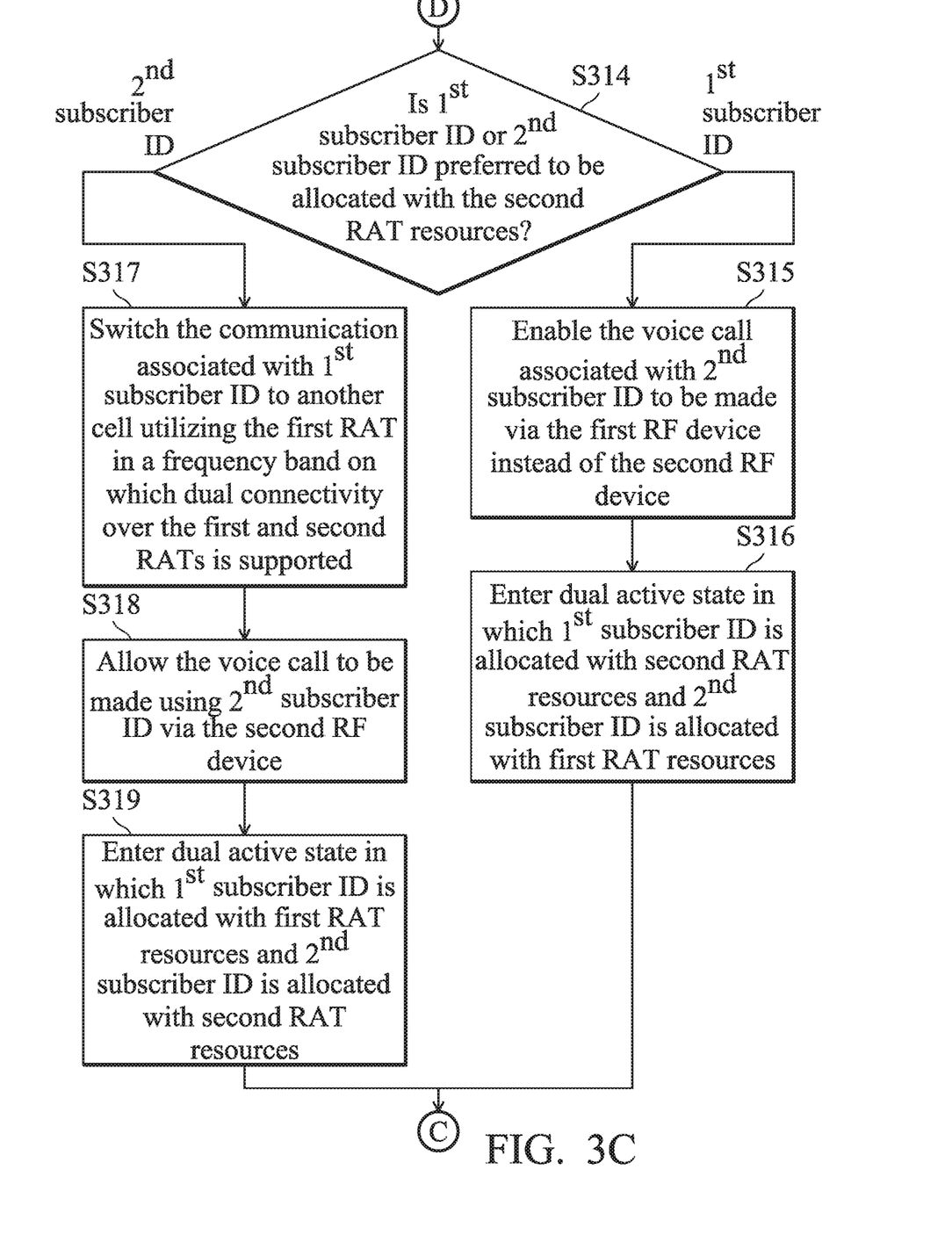

Subsequent to step S310, the mobile communication device allows the 5G data session to be conducted using the second subscriber identity via the second RF device (step S311), and enters a dual active state in which the first subscriber identity is allocated with the first RAT resources (including the first RF device, and the radio resources of the first RAT) and the second subscriber identity is allocated with the second RAT resources (including the second RF device, and the radio resources of the second RAT) (step S312).

Back to step S303, if the second subscriber identity card is provided by a SIM/USIM card configured for non-data services (i.e., a non-data (U)SIM card), the mobile communication device determines whether the type of service associated with the incoming event is a VoNR call or an VoLTE call (step S313).

Subsequent to step S313, if the type of service associated with the incoming event is a VoNR call (i.e., the second RAT is a 5G cellular technology), the mobile communication device determines which of the first subscriber identity and the second subscriber identity is preferred to be allocated with the second RAT resources (step S314).

In one embodiment, the preference of allocating the second RATs resources to the first subscriber identity card or the second subscriber identity card may be configured by the user of the mobile communication device. For example, the second RAT may be the most advanced RAT (e.g., a 5G cellular technology) supported by the mobile communication device, and the user may prefer one of the first subscriber identity and the second subscriber identity card to be allocated with the second RAT resources.

Figure 3D:
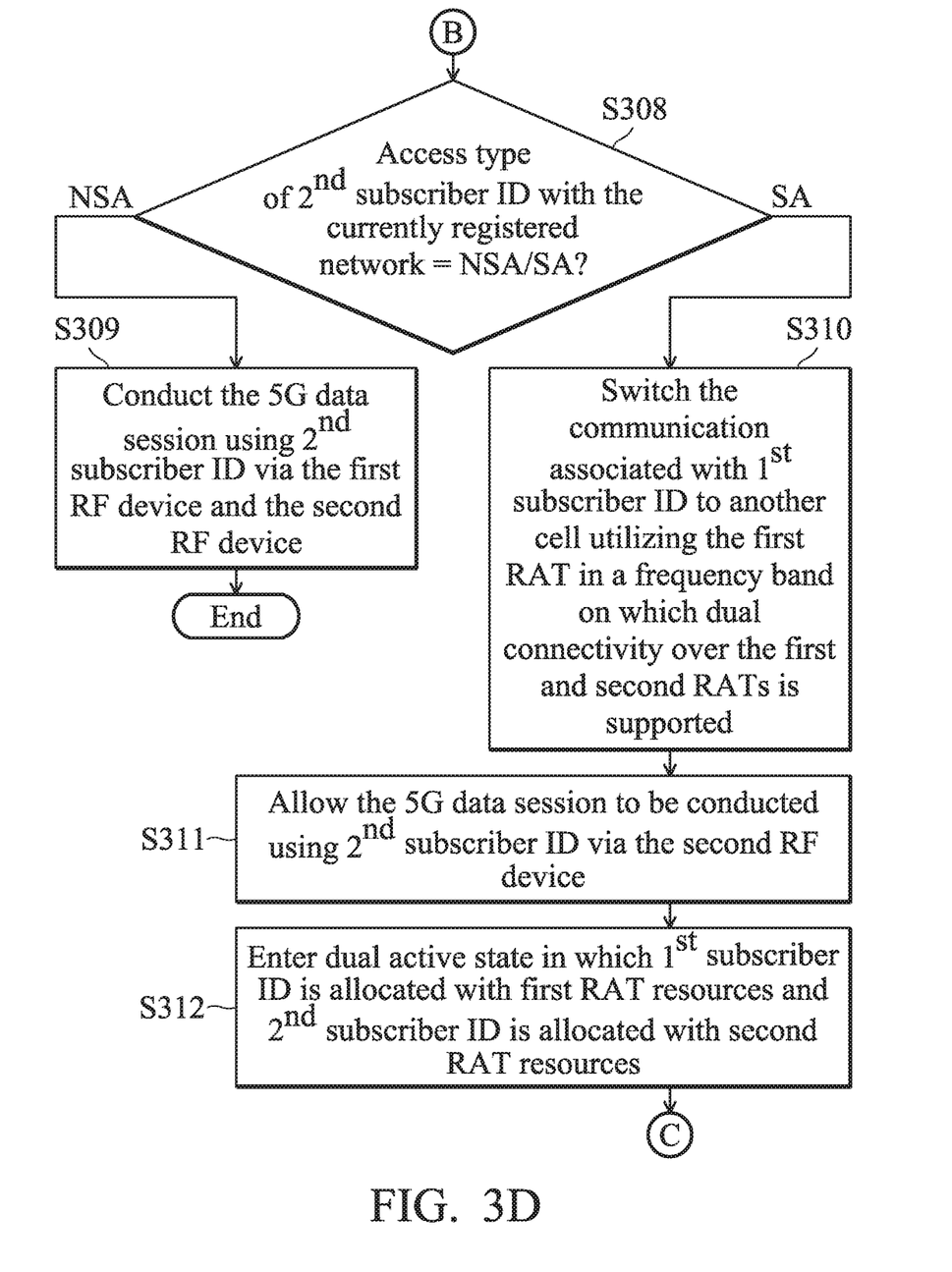

Subsequent to step S314, if the first subscriber identity is preferred to be allocated with the second RAT resources, the mobile communication device enables the voice call associated with the second subscriber identity to be made via the first RF device instead of the second RF device (step S315).

In one embodiment, step S315 may be realized by sending a measurement report with an event type of B1 or B2 via the second RF device to trigger an EPS (Evolved Packet System) fallback procedure using the second subscriber identity card for making the voice call via the first RF device (i.e., the first RAT is a 4G cellular technology).

Specifically, the event type of B1 indicates that the signal quality of an inter-RAT neighbor cell becomes better than a first threshold, and the event type of B2 indicates that the signal quality of a Primary Cell (PCell) becomes worse than a second threshold and the signal quality of an inter-RAT neighbor cell becomes better than a third threshold.

Subsequent to step S315, the mobile communication device enters a dual active state in which the first subscriber identity is allocated with the second RAT resources and the second subscriber identity is allocated with the first RAT resources (step S316).

Back to step S314, if the second subscriber identity is preferred to be allocated with the second RAT resources, the mobile communication device switches the communication associated with the first subscriber identity to another cell utilizing the first RAT in a frequency band on which dual connectivity over the first RAT and the second RAT is supported (step S317).

Figure 3E:
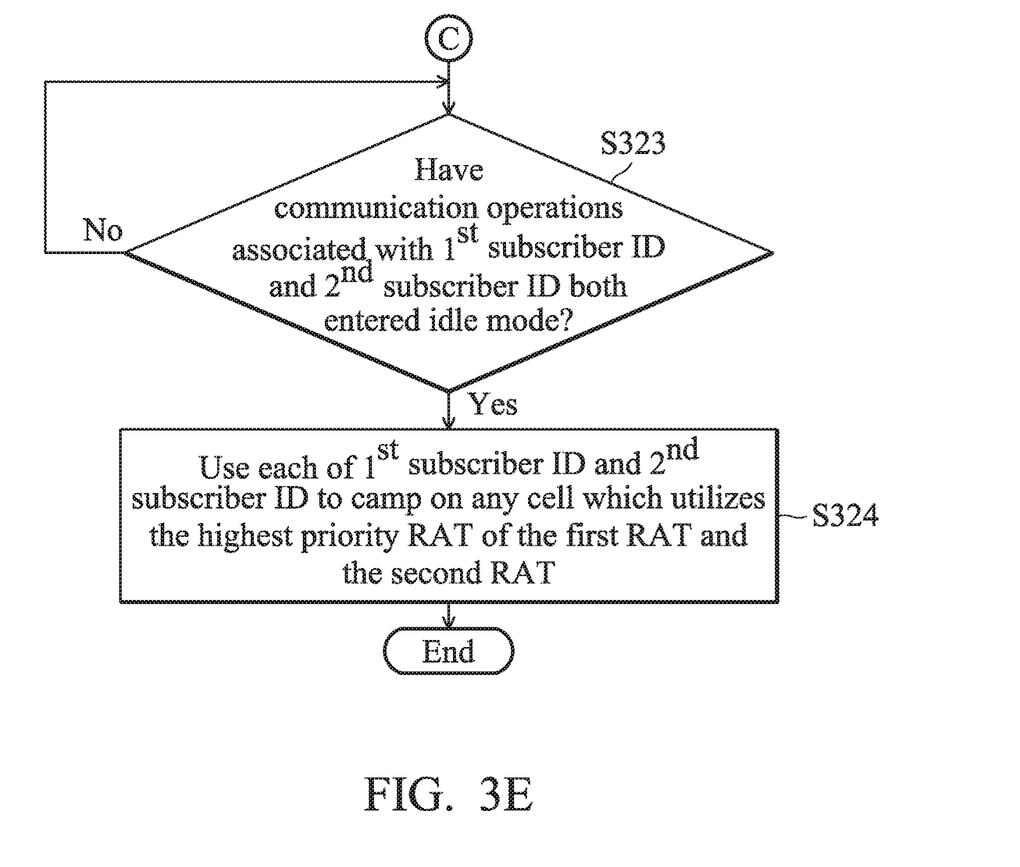

Subsequent to step S317, the mobile communication device allows the voice call to be made using the second subscriber identity via the second RF device (step S318), and enters a dual active state in which the first subscriber identity is allocated with the first RAT resources and the second subscriber identity is allocated with the second RAT resources (step S319).

Back to step S313, if the type of service associated with the incoming event is an VoLTE call, the mobile communication device switches the communication associated with the first subscriber identity to another cell utilizing the first RAT in a frequency band on which dual connectivity over the first RAT and the second RAT is supported (step S320).

Subsequent to step S320, the mobile communication device allows the voice call to be made using the second subscriber identity via the second RF device (step S321), and enters a dual active state in which the first subscriber identity is allocated with the first RAT resources and the second subscriber identity is allocated with the second RAT resources (step S322).

Subsequent to steps S307, S312, S316, S319, and S322, the mobile communication device determines whether the communication operations associated with the first subscriber identity and the second subscriber identity have both entered an idle mode (e.g., the RRC_IDLE mode) (step S323).

Subsequent to step S323, if the communication operations associated with the first subscriber identity and the second subscriber identity have both entered an idle mode, the mobile communication device uses each of the first subscriber identity and the second subscriber identity to camp on any cell which utilizes the highest priority RAT of the first RAT and the second RAT (step S324), and the method ends. Otherwise, if the communication operations associated with the first subscriber identity and the second subscriber identity have not both entered an idle mode, the method stays in step S323.

In one embodiment, the highest priority RAT may refer to the most advanced RAT (e.g., a 5G cellular technology) supported by the mobile communication device. In another embodiment, the highest priority RAT may refer to the user's most preferred RAT among all RATs supported by the mobile communication device.

Figure 4A:
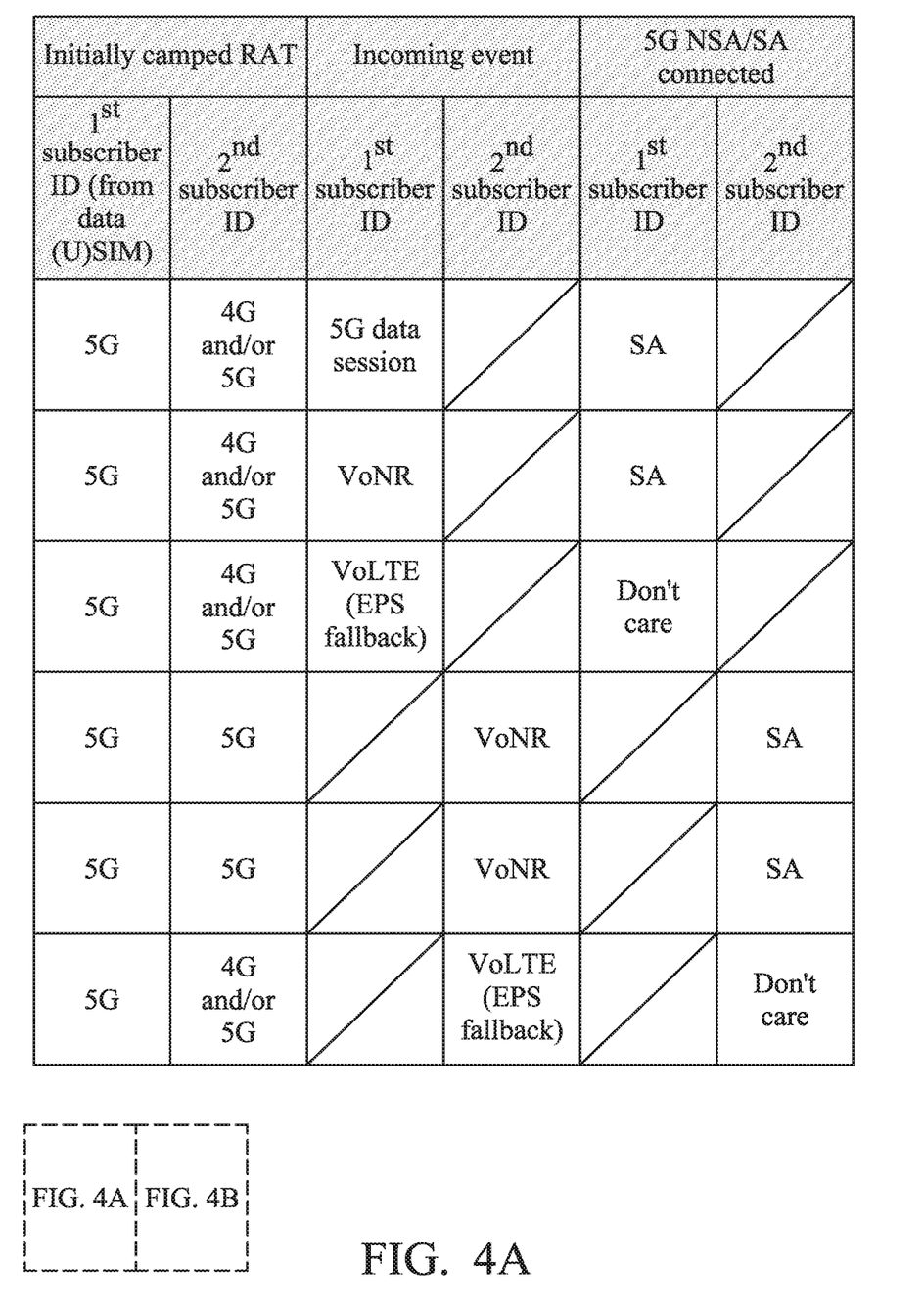
FIGS. 4A and 4B show a table illustrating various scenarios for dual active of multiple subscriber identities according to an embodiment of the application.
Figure 4B:
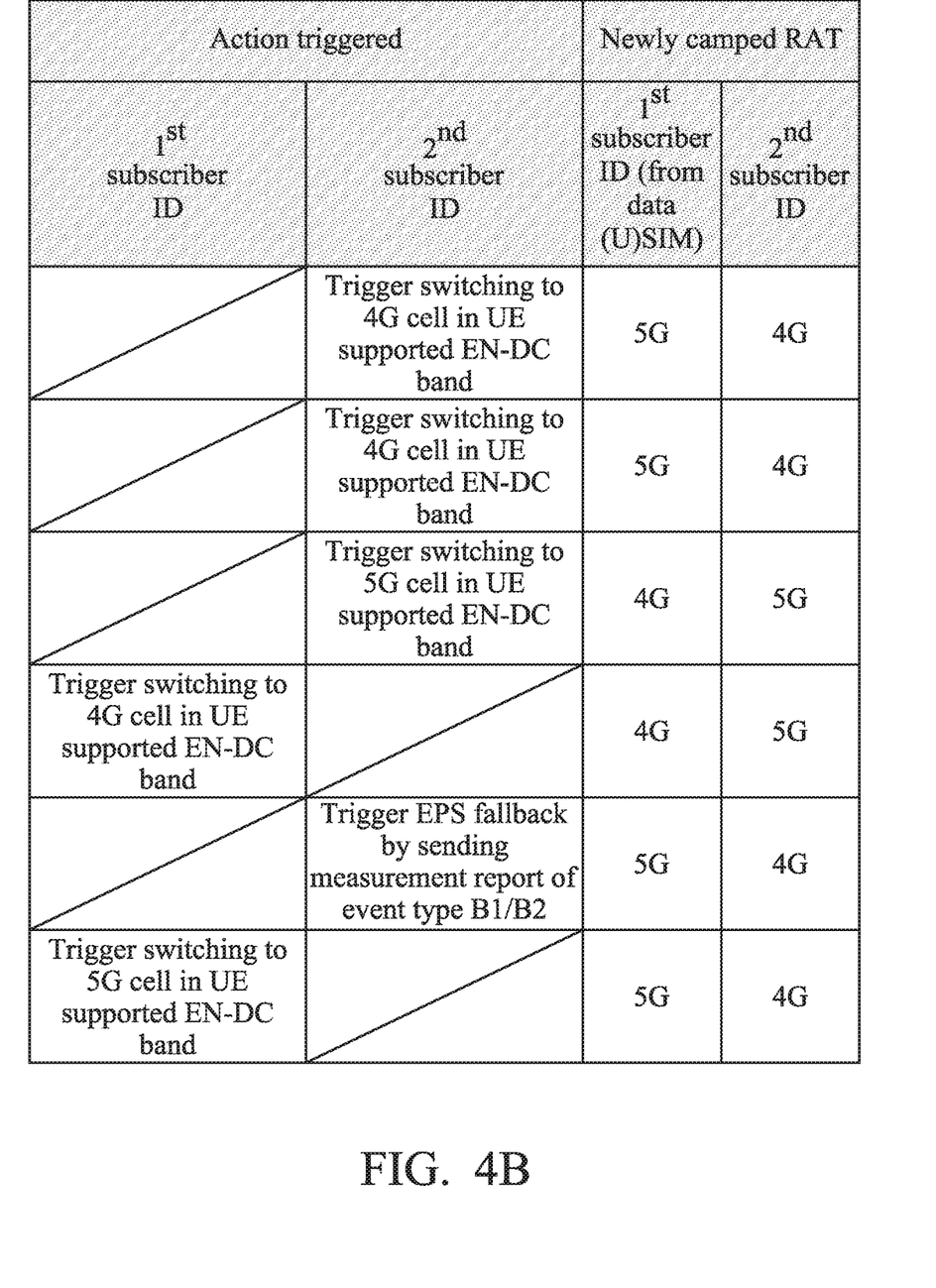

FIGS. 4A and 4B show a table illustrating various scenarios for dual active of multiple subscriber identities according to an embodiment of the application.

In this embodiment, the first subscriber identity is provided by a SIM/USIM card configured for data services (i.e., a data (U)SIM card), while the second subscriber identity card is provided by a SIM/USIM card configured for non-data services (i.e., a non-data (U)SIM card).

As shown in the first row in white background of the table, the RAT utilized by the service network on which the mobile communication device is initially camped using the first subscriber identity is a 5G cellular technology, while the RAT(s) utilized by the service network on which the mobile communication device is initially camped using the second subscriber identity is 4G and/or 5G cellular technology/technologies. An incoming event for conducting a 5G data session using the first subscriber identity is received. In response to the incoming event and the access type of the first subscriber identity with the currently registered network being SA, the controller (e.g., the controller 20) of the mobile communication device may trigger a cell (re)selection procedure or a handover procedure using the second subscriber identity, to switch to a 4G cell in a frequency band on which EN-DC/NE-DC/NGEN-DC is supported. After that, the RAT utilized by the service network on which the mobile communication device is newly camped using the first subscriber identity is a 5G cellular technology, while the RAT utilized by the service network on which the mobile communication device is newly camped using the second subscriber identity is a 4G cellular technology.

As shown in the second row in white background of the table, the RAT utilized by the service network on which the mobile communication device is initially camped using the first subscriber identity is a 5G cellular technology, while the RAT(s) utilized by the service network on which the mobile communication device is initially camped using the second subscriber identity is 4G and/or 5G cellular technology/technologies. An incoming event for making a VoNR call using the first subscriber identity is received. In response to the incoming event and the access type of the first subscriber identity with the currently registered network being SA, the controller (e.g., the controller 20) of the mobile communication device may trigger a cell (re)selection procedure or a handover procedure using the second subscriber identity, to switch to a 4G cell in a frequency band on which EN-DC/NE-DC/NGEN-DC is supported. After that, the RAT utilized by the service network on which the mobile communication device is newly camped using the first subscriber identity is a 5G cellular technology, while the RAT utilized by the service network on which the mobile communication device is newly camped using the second subscriber identity is a 4G cellular technology.

As shown in the third row in white background of the table, the RAT utilized by the service network on which the mobile communication device is initially camped using the first subscriber identity is a 5G cellular technology, while the RAT(s) utilized by the service network on which the mobile communication device is initially camped using the second subscriber identity is 4G and/or 5G cellular technology/technologies. An incoming event for making an VoLTE call using the first subscriber identity is received. In response to the incoming event, the controller (e.g., the controller 20) of the mobile communication device may trigger a cell (re)selection procedure or a handover procedure using the second subscriber identity, to switch to a 5G cell in a frequency band on which EN-DC/NE-DC/NGEN-DC is supported. After that, the RAT utilized by the service network on which the mobile communication device is newly camped using the first subscriber identity is a 4G cellular technology, while the RAT utilized by the service network on which the mobile communication device is newly camped using the second subscriber identity is a 5G cellular technology.

As shown in the fourth row in white background of the table, the RATs utilized by the service networks on which the mobile communication device is initially camped using the first subscriber identity and the second subscriber identity are both a 5G cellular technology. An incoming event for making a VoNR call using the second subscriber identity is received. In response to the incoming event and the access type of the second subscriber identity with the currently registered network being SA, the controller (e.g., the controller 20) of the mobile communication device may trigger a cell (re)selection procedure or a handover procedure using the first subscriber identity, to switch to a 4G cell in a frequency band on which EN-DC/NE-DC/NGEN-DC is supported. After that, the RAT utilized by the service network on which the mobile communication device is newly camped using the first subscriber identity is a 4G cellular technology, while the RAT utilized by the service network on which the mobile communication device is newly camped using the second subscriber identity is a 5G cellular technology.

As shown in the fifth row in white background of the table, the RATs utilized by the service networks on which the mobile communication device is initially camped using the first subscriber identity and the second subscriber identity are both a 5G cellular technology. An incoming event for making a VoNR call using the second subscriber identity is received. In response to the incoming event and the access type of the second subscriber identity with the currently registered network being SA, the controller (e.g., the controller 20) of the mobile communication device may trigger an EPS fallback procedure using the second subscriber identity, to switch to a 4G cell to make the voice call. After that, the RAT utilized by the service network on which the mobile communication device is newly camped using the first subscriber identity remains the same 5G cellular technology, while the RAT utilized by the service network on which the mobile communication device is newly camped using the second subscriber identity is a 4G cellular technology.

As shown in the sixth row in white background of the table, the RAT utilized by the service network on which the mobile communication device is initially camped using the first subscriber identity is a 5G cellular technology, while the RAT(s) utilized by the service network on which the mobile communication device is initially camped using the second subscriber identity is 4G and/or 5G cellular technology/technologies. An incoming event for making an VoLTE call using the second subscriber identity is received. In response to the incoming event, the controller (e.g., the controller 20) of the mobile communication device may trigger a cell (re)selection procedure or a handover procedure using the first subscriber identity, to switch to a 5G cell in a frequency band on which EN-DC/NE-DC/NGEN-DC is supported. After that, the RAT utilized by the service network on which the mobile communication device is newly camped using the first subscriber identity remains a 5G cellular technology, while the RAT utilized by the service network on which the mobile communication device is newly camped using the second subscriber identity is a 4G cellular technology.

In view of the forgoing embodiments, it will be appreciated that the present application realizes dual active of multiple subscriber identities in dual-card cellular phones, by leveraging the feature of EN-DC/NE-DC/NGEN-DC in a novel way that the dual connectivity with a 5G network and a 4G network for a single subscriber identity is divided into a connectivity with a 5G network for one subscriber identity and a connectivity with a 4G network for another subscriber identity.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A mobile communication device, comprising:
a first Radio Frequency (RF) device, configured to perform wireless transmission and reception utilizing a first Radio Access Technology (RAT);
a second RF device, configured to perform wireless transmission and reception utilizing a second RAT; and a controller, configured to use a first subscriber identity to communicate with a first cell via the first RF device or the second RF device, detect an incoming event for making a voice call or conducting a data session using a second subscriber identity via the second RF device during the communication associated with the first subscriber identity, and in response to the incoming event:
- switch the communication associated with the first subscriber identity to a second cell utilizing the first RAT in a frequency band on which dual connectivity over the first RAT and the second RAT is supported, or
- enable the voice call associated with the second subscriber identity to be made via the first RF device when the communication associated with the first subscriber identity is performed via the second RF device.

2. The mobile communication device of claim 1, wherein the dual connectivity over the first RAT and the second RAT is Evolved-Universal Terrestrial Radio Access (E-UTRA)-NR Dual Connectivity (EN-DC), NR-EUTRA Dual Connectivity (NE-DC), or Next Generation EN-DC (NGEN-DC), when the first RAT or the second RAT is a fifth generation (5G) cellular technology and the other of the first RAT or the second RAT is a fourth generation (4G) cellular technology.

3. The mobile communication device of claim 1, wherein the switching of the communication associated with the first subscriber identity to the second cell comprises:
- triggering a cell selection or reselection procedure using the first subscriber identity, to switch from the first cell to the second cell when the communication associated with the first subscriber identity is in an idle mode; or
- triggering a handover procedure using the first subscriber identity, to switch from the first cell to the second cell when the communication associated with the first subscriber identity is in a connected mode.

4. The mobile communication device of claim 1, wherein the voice call is a Voice over New Radio (VoNR) call or a Voice over Long Term Evolution (VoLTE) call.

5. The mobile communication device of claim 4, wherein, when the voice call is a VoNR call and the second subscriber identity is provided by a Subscriber Identity Module (SIM) or Universal SIM (USIM) card configured for non-data services, the enabling of the voice call associated with the second subscriber identity to be made via the first RF device comprises:
- sending a measurement report with an event type via the second RF device to trigger an EPS (Evolved Packet System) fallback procedure using the second subscriber identity for making the voice call via the first RF device.

6. The mobile communication device of claim 5, wherein the event type indicates that a first signal quality of an inter-RAT neighbor cell becomes better than a first threshold, or that a second signal quality of a Primary Cell (PCell) becomes worse than a second threshold and a third signal quality of an inter-RAT neighbor cell becomes better than a third threshold.

7. The mobile communication device of claim 1, wherein the controller is further configured to use each of the first subscriber identity card and the second subscriber identity card to camp on any cell which utilizes the highest priority RAT of the first RAT and the second RAT, when communication operations associated with the first subscriber identity and the second subscriber identity have both entered an idle mode.

8. A method for dual active of multiple subscriber identities, executed by a mobile communication device which comprises a first Radio Frequency (RF) device utilizing a first Radio Access Technology (RAT) and a second RF device utilizing a second RAT, the method comprising:
- using a first subscriber identity to communicate with a first cell via the first RF device or the second RF device;
- detecting an incoming event for making a voice call or conducting a data session using a second subscriber identity via the second RF device during the communication associated with the first subscriber identity; and
- in response to the incoming event:
  - switching the communication associated with the first subscriber identity to a second cell utilizing the first RAT in a frequency band on which dual connectivity over the first RAT and the second RAT is supported, or
  - enabling the voice call associated with the second subscriber identity to be made via the first RF device when the communication associated with the first subscriber identity is performed via the second RF device.

9. The method of claim 8, wherein the dual connectivity over the first RAT and the second RAT is Evolved-Universal Terrestrial Radio Access (E-UTRA)-NR Dual Connectivity (EN-DC), NR-EUTRA Dual Connectivity (NE-DC), or Next Generation EN-DC (NGEN-DC), when the first RAT or the second RAT is a fifth generation (5G) cellular technology and the other of the first RAT or the second RAT is a fourth generation (4G) cellular technology.

10. The method of claim 8, wherein the switching of the communication associated with the first subscriber identity to the second cell comprises:
- triggering a cell selection or reselection procedure using the first subscriber identity, to switch from the first cell to the second cell when the communication associated with the first subscriber identity is in an idle mode; or
- triggering a handover procedure using the first subscriber identity, to switch from the first cell to the second cell when the communication associated with the first subscriber identity is in a connected mode.

11. The method of claim 8, wherein the voice call is a Voice over New Radio (VoNR) call or a Voice over Long Term Evolution (VoLTE) call.

12. The method of claim 11, wherein, when the voice call is a VoNR call and the second subscriber identity is provided by a Subscriber Identity Module (SIM) or Universal SIM (USIM) card configured for non-data services, the enabling of the voice call associated with the second subscriber identity to be made via the first RF device comprises:
- sending a measurement report with an event type via the second RF device to trigger an EPS (Evolved Packet System) fallback procedure using the second subscriber identity for making the voice call via the first RF device.

13. The method of claim 12, wherein the event type indicates that a first signal quality of an inter-RAT neighbor cell becomes better than a first threshold, or that a second signal quality of a Primary Cell (PCell) becomes worse than a second threshold and a third signal quality of an inter-RAT neighbor cell becomes better than a third threshold.

14. The method of claim 8, further comprising:
using each of the first subscriber identity card and the second subscriber identity card to camp on any cell which utilizes the highest priority RAT of the first RAT and the second RAT, when communication operations associated with the first subscriber identity and the second subscriber identity have both entered an idle mode.

15. A non-transitory computer-readable storage medium comprising computer program that, when executed, causes a mobile communication device comprising a first Radio Frequency (RF) device utilizing a first Radio Access Technology (RAT) and a second RF device utilizing a second RAT to perform a method for dual active of multiple subscriber identities, wherein the method comprises:
using a first subscriber identity to communicate with a first cell via the first RF device or the second RF device;
detecting an incoming event for making a voice call or conducting a data session using a second subscriber identity via the second RF device during the communication associated with the first subscriber identity; and
in response to the incoming event:
switching the communication associated with the first subscriber identity to a second cell utilizing the first RAT in a frequency band on which dual connectivity over the first RAT and the second RAT is supported, or
enabling the voice call associated with the second subscriber identity to be made via the first RF device when the communication associated with the first subscriber identity is performed via the second RF device.

16. The non-transitory computer-readable storage medium of claim 15, wherein the dual connectivity over the first RAT and the second RAT is Evolved-Universal Terrestrial Radio Access (E-UTRA)-NR Dual Connectivity (EN-DC), NR-EUTRA Dual Connectivity (NE-DC), or Next Generation EN-DC (NGEN-DC), when the first RAT or the second RAT is a fifth generation (5G) cellular technology and the other of the first RAT or the second RAT is a fourth generation (4G) cellular technology.

17. The non-transitory computer-readable storage medium of claim 15, wherein the switching of the communication associated with the first subscriber identity to the second cell comprises:
triggering a cell selection or reselection procedure using the first subscriber identity, to switch from the first cell to the second cell when the communication associated with the first subscriber identity is in an idle mode; or
triggering a handover procedure using the first subscriber identity, to switch from the first cell to the second cell when the communication associated with the first subscriber identity is in a connected mode.

18. The non-transitory computer-readable storage medium of claim 15, wherein, when the voice call is a VoNR call and the second subscriber identity is provided by a Subscriber Identity Module (SIM) or Universal SIM (USIM) card configured for non-data services, the enabling of the voice call associated with the second subscriber identity to be made via the first RF device comprises:
sending a measurement report with an event type via the second RF device to trigger an EPS (Evolved Packet System) fallback procedure using the second subscriber identity for making the voice call via the first RF device.

19. The non-transitory computer-readable storage medium of claim 18, wherein the event type indicates that a first signal quality of an inter-RAT neighbor cell becomes better than a first threshold, or that a second signal quality of a Primary Cell (PCell) becomes worse than a second threshold and a third signal quality of an inter-RAT neighbor cell becomes better than a third threshold.

20. The non-transitory computer-readable storage medium of claim 15, the method further comprises:
using each of the first subscriber identity card and the second subscriber identity card to camp on any cell which utilizes the highest priority RAT of the first RAT and the second RAT, when communication operations associated with the first subscriber identity and the second subscriber identity have both entered an idle mode.

* * * * *